(12) United States Patent
Mizuno et al.

(10) Patent No.: US 10,247,161 B2
(45) Date of Patent: Apr. 2, 2019

(54) MOTOR GENERATOR, ENGINE STARTING DEVICE, AND ENGINE START CONTROL METHOD

(71) Applicant: MITSUBISHI ELECTRIC CORPORATION, Chiyoda-ku (JP)

(72) Inventors: Daisuke Mizuno, Chiyoda-ku (JP);
Hiroaki Kitano, Chiyoda-ku (JP);
Koichiro Kamei, Chiyoda-ku (JP);
Kensuke Kato, Chiyoda-ku (JP);
Kazuhiro Odahara, Chiyoda-ku (JP);
Naohito Kaneda, Chiyoda-ku (JP)

(73) Assignee: MITSUBISHI ELECTRIC CORPORATION, Chiyoda-ku (JP)

( * ) Notice: Subject to any disclaimer, the term of this patent is extended or adjusted under 35 U.S.C. 154(b) by 0 days.

(21) Appl. No.: 15/564,296

(22) PCT Filed: May 11, 2016

(86) PCT No.: PCT/JP2016/063973
§ 371 (c)(1),
(2) Date: Oct. 4, 2017

(87) PCT Pub. No.: WO2016/181985
PCT Pub. Date: Nov. 17, 2016

(65) Prior Publication Data
US 2018/0135583 A1 May 17, 2018

(30) Foreign Application Priority Data
May 12, 2015 (JP) ................................. 2015-097320

(51) Int. Cl.
*F02N 11/08* (2006.01)
*F02N 11/00* (2006.01)
(Continued)

(52) U.S. Cl.
CPC .......... *F02N 11/0851* (2013.01); *F02N 11/00* (2013.01); *F02N 11/04* (2013.01);
(Continued)

(58) Field of Classification Search
CPC .. F02N 11/0851; F02N 15/043; F02N 15/067; F02N 11/04; F02N 15/06;
(Continued)

(56) References Cited

U.S. PATENT DOCUMENTS 6,555,927 B1    4/2003  Suzuki et al.
2004/0133333 A1* 7/2004  Surewaard ............ F02D 41/042
                                          701/99
(Continued)

FOREIGN PATENT DOCUMENTS

DE    102004033720 A1    2/2006
DE    102010017760 A1    1/2012
(Continued)

OTHER PUBLICATIONS

International Search Report dated Aug. 9, 2016, in PCT/JP2016/063973 filed May 11, 2016.

*Primary Examiner* — Joseph Dallo
(74) *Attorney, Agent, or Firm* — Oblon, McClelland, Maier & Neustadt, L.L.P.

(57) ABSTRACT

Provided is a motor generator, which is always connected to an engine via a belt, and is configured to carry out start control of the engine and power generation control, the motor generator having a two-output power transmission mechanism including: a belt driving mechanism, which is configured to drive the engine through the belt; and a gear driving mechanism, which includes a pinion gear to be coupled to a ring gear on the engine side in accordance with an external instruction, and is configured to drive the engine by the pinion gear being coupled to the ring gear, in which (Continued)

an output of the belt driving mechanism and an output of the gear driving mechanism are arranged at positions opposing each other in an axial direction of a rotor of the motor generator.

20 Claims, 6 Drawing Sheets

(51) Int. Cl.
  *F02N 11/04* (2006.01)
  *F02N 15/06* (2006.01)
  *F02N 15/08* (2006.01)
  *F02N 15/04* (2006.01)
  *F16H 37/02* (2006.01)
  *F02N 15/02* (2006.01)

(52) U.S. Cl.
  CPC ............ *F02N 15/043* (2013.01); *F02N 15/06* (2013.01); *F02N 15/067* (2013.01); *F02N 15/08* (2013.01); *F16H 37/02* (2013.01); *F02N 15/022* (2013.01); *F02N 2011/0896* (2013.01); *F02N 2200/122* (2013.01)

(58) Field of Classification Search
  CPC .. F02N 11/00; F02N 15/08; F02N 2011/0896; F02N 15/022; F02N 2200/122; F16H 37/02
  See application file for complete search history.

(56) References Cited

U.S. PATENT DOCUMENTS

| | | | |
|---|---|---|---|
| 2005/0022770 A1* | 2/2005 | Yumiyama | F02N 15/026 123/179.4 |
| 2009/0294204 A1* | 12/2009 | Kang | B62D 5/04 180/444 |
| 2010/0145573 A1 | 6/2010 | Vasilescu | |
| 2011/0121571 A1* | 5/2011 | Wartanian | F02N 11/04 290/46 |
| 2011/0241500 A1* | 10/2011 | Lamke | B60K 1/02 310/75 D |
| 2013/0099507 A1* | 4/2013 | Moriya | F02N 15/067 290/38 E |
| 2014/0130635 A1* | 5/2014 | Kees | F02N 11/006 74/7 R |
| 2014/0299437 A1* | 10/2014 | Seillier | F02N 15/025 192/66.32 |
| 2015/0066338 A1* | 3/2015 | Howell | F02N 11/0844 701/112 |
| 2015/0260145 A1 | 9/2015 | Holmes et al. | |

FOREIGN PATENT DOCUMENTS

| | | |
|---|---|---|
| JP | 2000-161102 A | 6/2000 |
| JP | 2001-152901 A | 6/2001 |
| JP | 2003-506627 A | 2/2003 |
| JP | 2003-328907 A | 11/2003 |
| JP | 2004-308496 A | 11/2004 |
| JP | 2010-513771 A | 4/2010 |
| JP | 2014-101847 A | 6/2014 |
| JP | 2014-134130 A | 7/2014 |
| JP | 2014-218925 A | 11/2014 |

* cited by examiner

MOTOR GENERATOR, ENGINE STARTING DEVICE, AND ENGINE START CONTROL METHOD

TECHNICAL FIELD

The present invention relates to an engine starting device including a motor generator having a power generation function and an engine start function, and more particularly, to a motor generator, an engine starting device, and an engine start control method for realizing a decrease in cost.

BACKGROUND ART

The following vehicle has hitherto been well known. That is, the vehicle has installed thereon a motor generator having a power generation function and an engine start function, and a starter configured to crank an engine when the engine is started. The vehicle further has an idle stop function of automatically stopping the engine in accordance with set conditions, and restarting the engine in accordance with a request for restarting.

In this type of vehicle, the motor generator, which is operationally associated with the engine, is used to convert an engine output to generated power, and the motor generator and the starter are selectively or simultaneously used to start the engine depending on a state (e.g., refer to Patent Literatures 1 and 2).

Specifically, a battery is charged by the motor generator through a rotation output of the engine in a normal operation, and when the engine is started, a starting torque and a driving torque are respectively supplied to the motor generator and the starter through a battery output.

For example, the engine start control device disclosed in Patent Literature 1 includes control means for starting the engine using the starter when the engine is initially started through an ignition key, and restarting the engine using the motor generator when the engine is restarted from an engine stop state brought about by the idle stop function.

Moreover, the engine start control device disclosed in Patent Literature 1 also includes control means for starting the engine using the starter at a temperature less than a predetermined temperature, and starting the engine using the motor generator at a temperature equal to or more than the predetermined temperature, based on an ambient temperature of the engine.

Further, the engine start control device disclosed in Patent Literature 2 includes the following control means. Specifically, the engine start control device disclosed in Patent Literature 2 is configured to perform cranking using only the starter or simultaneously using the starter and the motor generator at the beginning of the cranking when the stopped engine is to be started.

Further, the engine start control device disclosed in Patent Literature 2 is configured to set a period of cranking by the starter or a rotation speed at which the cranking is finished in accordance with a friction resistance of a crankshaft, and then transition to cranking by only the motor generator.

CITATION LIST

Patent Literature

[PTL1] JP 2001-152901 A
[PTL2] JP 2014-101847 A

SUMMARY OF INVENTION

Technical Problem

However, the related art has the following problems.

The related-art engine start control device is configured to carry out the control of starting the engine by the starter in the initial engine starting. Moreover, the related-art engine start control device is configured to carry out the control of restarting the engine by the motor generator in the restarting from the stop for idle stop. The related-art engine start control device is configured to carry out the control of starting the engine by the starter at a temperature less than the predetermined temperature, and restarting the engine by the motor generator at a temperature equal to or more than the predetermined temperature.

The related art has the two engine starting devices for starting and restarting the engine in this way. As a result, the two engine starting devices not only hinder a decrease in fuel consumption, which is realized by a decrease in the weight of the vehicle, but also cause an increase in the number of components, resulting in an increase in the cost.

Thus, when the engine is to be started only by the belt driving of the motor generator, it is necessary to take a measure of increasing the friction so as to prevent the belt from slipping at a low temperature. However, in taking this measure, there is such a problem that independent systems and mechanisms are necessary for various influences such as degradation of fuel consumption performance due to an increase in a friction load, humidity, and freezing.

Meanwhile, the size may be decreased by simultaneously using the motor generator and the starter thereby efficiently starting the engine, and considering a region where the starter is used so that cooperative control is carried out. However, the two motors are rotated in this case. As a result, there is such a problem as a decrease in the voltage due to a rush current, for example. Further, in terms of the energy, motor rotation energy of only one of the motors is transmitted, and hence there is such a problem that a waste of the energy cannot be eliminated.

The present invention has been made in view of the above-mentioned problems, and therefore has an object to provide a motor generator, an engine starting device, and an engine start control method, which are capable of quickly carrying out engine start control of the motor generator, which is connected via the belt, without the starter even at a low temperature, and realizing a decrease in the weight and a decrease in the cost.

Solution to Problem

According to one embodiment of the present invention, there is provided a motor generator, which is always connected to an engine via a belt, and is configured to carry out start control of the engine and power generation control, the motor generator having a two-output power transmission mechanism including: a belt driving mechanism, which is configured to drive the engine through the belt; and a gear driving mechanism, which includes a pinion gear to be coupled to a ring gear on the engine side in accordance with an external instruction, and is configured to drive the engine by the pinion gear being coupled to the ring gear, in which an output of the belt driving mechanism and an output of the gear driving mechanism are arranged at positions opposing each other in an axial direction of a rotor of the motor generator.

According to one embodiment of the present invention, there is provided an engine starting device, including: the motor generator of the present invention; and a control circuit configured to control the motor generator, the control circuit being configured to: carry out the start control of the engine by rotating the motor generator, thereby driving the engine by the belt driving mechanism; and carry out the start control of the engine through simultaneous use of the belt driving mechanism and the gear driving mechanism by outputting the external instruction, thereby driving the engine by the gear driving mechanism, when a condition under which slip occurs to the belt is established.

Moreover, according to one embodiment of the present invention, there is provided an engine start control method, which is carried out by the control circuit in the engine starting device of the present invention, the engine start control method including, when the start control of the engine is carried out: a first step of rotating the motor generator, thereby driving the engine by the belt driving mechanism; and a second step of outputting the external instruction of supplying the current to the electromagnetic switch, and driving the engine by the gear driving mechanism, thereby carrying out engine start control through simultaneous use of the belt driving mechanism and the gear driving mechanism, when the condition under which the slip occurs to the belt is determined to be established from a measurement result of an engine temperature or an engine ambient temperature after the first step.

Further, according to one embodiment of the present invention, there is provided an engine start control method of controlling the motor generator of the present invention, including, when the start control of the engine is carried out: a first step of rotating the motor generator, thereby driving the engine by the belt driving mechanism; and a second step of outputting the external instruction of supplying the current to the electromagnetic switch, and driving the engine by the gear driving mechanism, thereby carrying out engine start control through simultaneous use of the belt driving mechanism and the gear driving mechanism, when the condition under which the slip occurs to the belt is determined to be established from a measurement result of an engine temperature or an engine ambient temperature after the first step.

Advantageous Effects of Invention

The present invention includes such a configuration that the engine is started by the pinion gear, thereby carrying out the engine start control through simultaneous use of the belt driving mechanism and the gear driving mechanism in a region in which a load in a neighborhood of a top dead center of a first compression stroke is high, and the belt starts slipping at a low temperature. As a result, there can be provided the motor generator, the engine starting device, and the engine start control method, which are capable of quickly carrying out the engine start control of the motor generator, which is connected via the belt, without the starter even at a low temperature, and realizing a decrease in the weight and a decrease in the cost.

DESCRIPTION OF EMBODIMENTS

A description is now given of a motor generator, an engine starting device, and an engine start control method according to preferred embodiments of the present invention referring to the drawings.

First Embodiment

Figure 1:
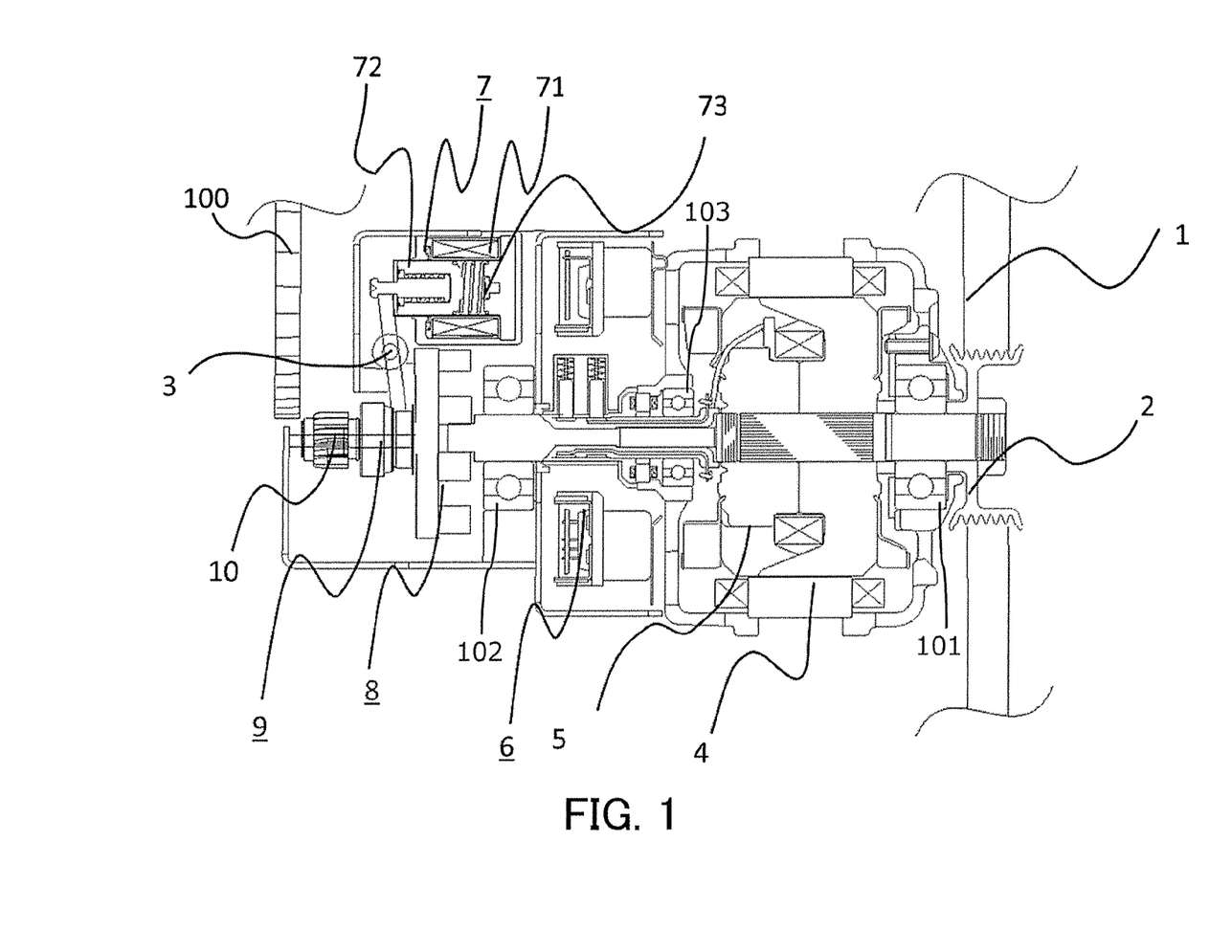
FIG. 1 is a cross sectional view for illustrating a motor generator part on which an engine starting device according to a first embodiment of the present invention is installed.

FIG. 1 is a cross sectional view for illustrating a motor generator part on which an engine starting device according to a first embodiment of the present invention is installed. In FIG. 1, the engine starting device is configured to carry out control including a function of determining engine starting through key starting, engine stopping in idle stop, and engine restarting, thereby carrying out driving control of starting an engine. A control circuit configured to carry out the engine control is hereinafter referred to as "engine ECU".

A crankshaft of the engine is always connected to the motor generator through a pulley 2 via a belt 1. A rotor part 4 and a stator part 5 exist inside the motor generator. AC power generated by rotating the rotor part 4 is converted into DC power by a rectifier inside an inverter part 6. Moreover, a voltage changed by a change in a rotation speed is maintained constant by a regulator.

The power generated in this way is charged to a battery. On this occasion, the engine ECU controls the inverter part 6 so as to suppress a power generation amount in a range in which a battery voltage does not fall below a required voltage. Moreover, the engine ECU uses regeneration brake through control that is carried out during deceleration and stopping, thereby regenerating energy, and controls a time for concentrated power generation and a time for suppressed power generation, thereby decreasing a wasteful engine load, resulting in an increase in fuel economy.

Further, the engine ECU is also capable of applying a voltage through power from the battery, thereby decreasing an engine load.

Moreover, when control of stopping the engine during deceleration and stopping for the idle stop, thereby further increasing the fuel economy is carried out, the engine ECU applies a voltage through power from the battery, thereby rotating the engine for starting through belt transmission via the pulley 2.

In the idle stop, for example, in which the engine has been warmed up, viscosity of lubricant and the like are low, and the engine load is not so high, the engine ECU starts the engine by only the belt driving, thereby enabling engine starting with low noise.

However, when the engine has not been warmed up, and an air temperature is equal to or less than a certain temperature, the belt starts slipping. Thus, according to the first embodiment, when the engine is initially determined not to have been warmed up, or the air temperature is determined to be equal to or less than a certain temperature through a sensor, for example, the engine ECU supplies a current to a solenoid coil 71 of a gear switch part 7.

A plunger 72 is attracted by the current supply to the solenoid coil 71, and a pinion gear 10 is pushed out toward a ring gear 100 by a lever 3.

The pinion gear 10 is constructed so as to be rotatable through a rotation of the rotor part 4 via a pinion gear-side speed reduction part 8 and a one-way clutch part 9 through a shaft, which is an extension of the inverter part 6, on an opposite side of the pulley 2 in the axial direction.

A force in a radial direction and the like are applied in the pinion gear part, and a bearing 102 is thus installed on a pinion side. Thus, three bearings of the bearing 102, a bearing 101 on a pulley side, and a bearing 103 on a motor inverter side are included. Through the installation of the bearing 102, the thus obtained structure can withstand impact generated by the meshing between the gears and the like.

The rotation of the pinion gear 10 for rotating the ring gear 100 on the engine side and the rotation of the output from the pulley 2 are opposite in the rotation direction. Therefore, the rotation direction is inverted in a speed reduction mechanism of the pinion gear-side speed reduction part 8.

When the pinion gear 10 is pushed out to mesh with the ring gear 100 of the engine, power generated by the rotation of the motor generator rotates the ring gear 100 via the pinion gear 10, thereby starting the engine. Thus, when the temperature is equal to or less than a predetermined temperature and the belt slips, the force can be transmitted by the pinion gear 10 and the ring gear 100, thereby starting the engine.

Further, the one-way clutch 9 is coupled so that the pinion gear 10 idles when, while the pinion gear 10 has been pushed out and is meshing with the ring gear 100 of the engine, the number of revolutions of the ring gear 100 becomes higher than the number of revolutions of the pinion gear 10 by the rotation of the engine (engine starting is determined to be completed based on the determination of the engine complete combustion).

Further, the plunger 72 is returned by a spring 73 pushing out the plunger 72 by bringing the current supply to the solenoid coil 71 into an off state. As a result, the pinion gear 10 is also returned via the lever 3, and the pinion gear 10 can thus be separated from the ring gear 100.

On this occasion, according to the first embodiment, a speed reduction ratio to the engine on the pinion gear 10 side is equal to or more than a speed reduction ratio of the pulley 2 by the belt driving. With those speed reduction ratios, the engine can be rotated by the belt 1 when the load torque is initially low, and the engine can be rotated by the transmission by the pinion gear 10 with the belt 1 slipping when the load torque is high before the top dead center.

Moreover, as illustrated in FIG. 1, according to the first embodiment, the output of the belt driving mechanism and the output of the gear driving mechanism are arranged at the positions opposing each other in the axial direction of a rotor of the motor generator.

Figure 2:
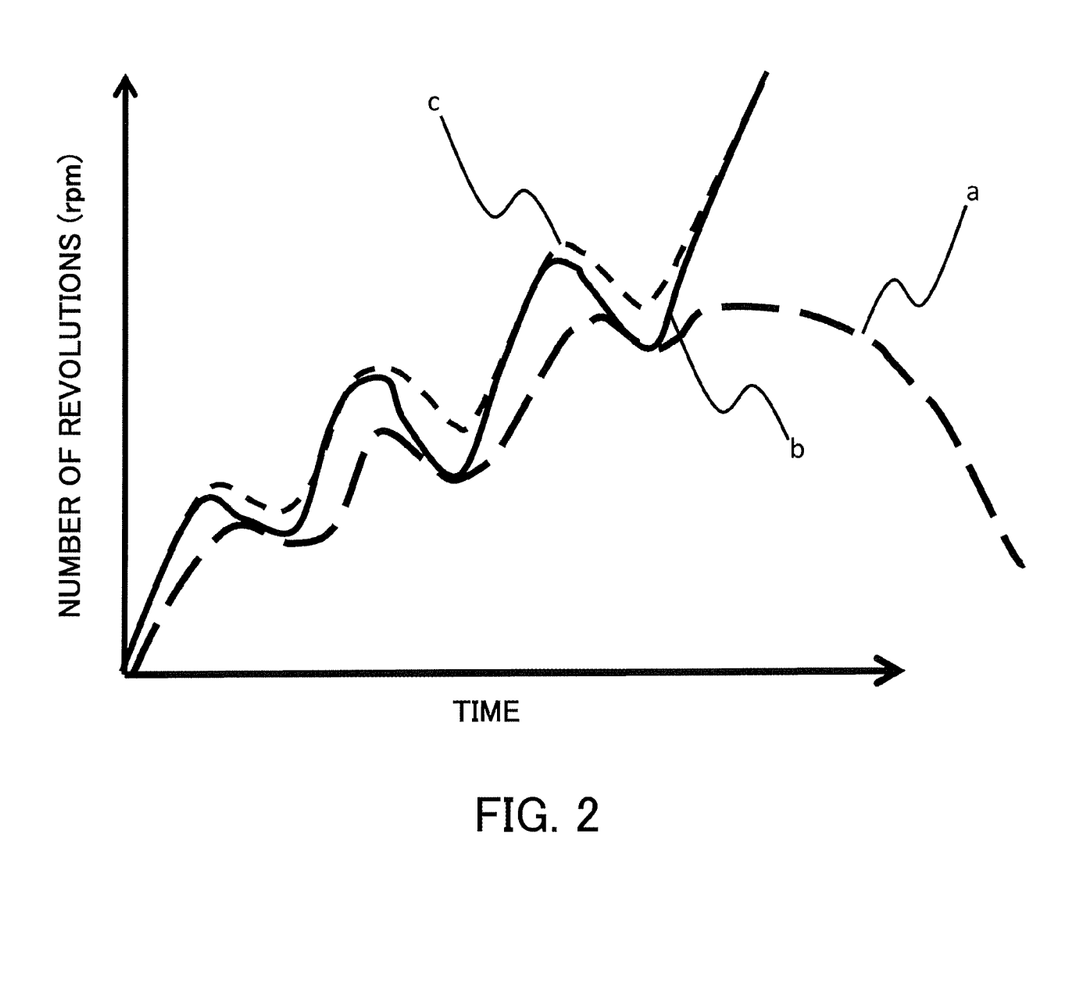
FIG. 2 is an explanatory graph for showing a relationship between the number of revolutions and the time when an engine is started under a predetermined condition according to the first embodiment of the present invention.

FIG. 2 is an explanatory graph for showing a relationship between the number of revolutions and the time when the engine is started under a predetermined condition according to the first embodiment of the present invention. In FIG. 2, a, b, and c respectively represent the following numbers of revolutions.

a: number of revolutions of the pinion gear 10 converted into an equivalent number of engine revolutions (hereinafter referred to as "pinion converted revolution number a")

b: number of engine revolutions c: number of revolutions of the belt-driving pulley 2 converted into an equivalent number of engine revolutions (hereinafter referred to as "pulley converted revolution number c")

As shown in FIG. 2, when the load torque is low, only the pulley converted revolution number c increases (the pulley 2 slips and becomes higher in the number of revolutions than the engine rotation), no longer matches the number of engine revolutions b, and then decreases as a result of the slip.

In contrast to this decrease in the speed, regarding the pinion converted revolution number a, the speed reduction ratio is high. Hence, the pinion gear 10 is idling through the one-way clutch part 9 while the engine is being rotated by the pulley 2, but the torque is transmitted through the pinion gear 10 when the engine rotation becomes lower.

Thus, the engine can efficiently be started by switching between the speed reduction ratio of the belt driving and the speed reduction ratio of the pinion gear 10 as represented by the number of engine revolutions b of FIG. 2. In other words, as shown in FIG. 2, the number of engine revolutions b can efficiently be started in such a way that the number of engine revolutions b remains between the pulley converted revolution number c and the pinion converted revolution number a. As a result, the engine can be started while wasteful energy is suppressed even at a low temperature.

Figure 3:
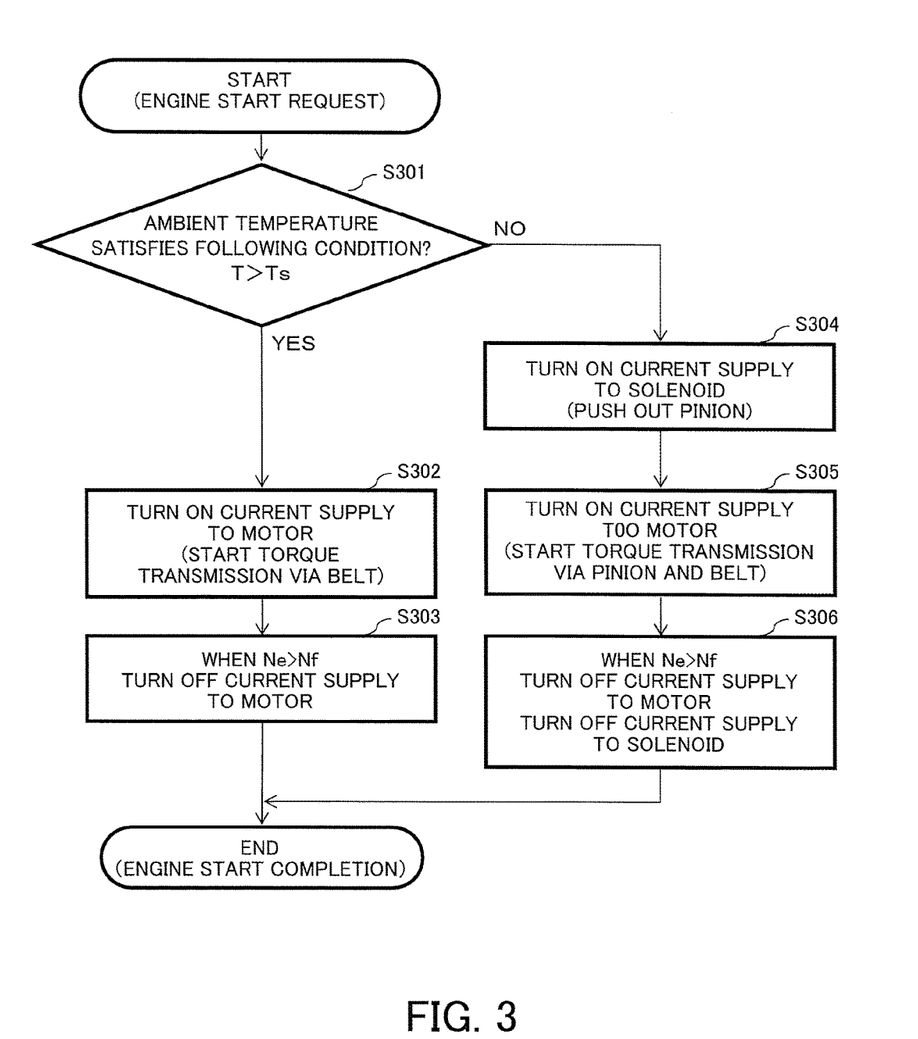
FIG. 3 is a control flow when the engine is started according to the first embodiment of the present invention.

FIG. 3 is a flowchart for illustrating a series of processing carried out by the engine ECU in the engine starting device according to the first embodiment of the present invention. As illustrated in FIG. 3, when an engine starting request is made, first, in Step S301, the engine ECU determines whether or not such a condition that a temperature T, which is the air temperature or an engine ambient temperature, is more than a reference temperature Ts set in advance is established.

When the condition is determined to be established in Step S301, the engine ECU proceeds to Step S302, turns on the current supply to the motor, and starts the torque transmission by the belt driving.

Then, in Step S303, the engine ECU turns off the motor current supply when the number of engine revolutions Ne is more than the number of revolutions Nf, which is a starting condition, and the engine starting is completed.

On the other hand, when the condition is determined not to be established in Step S301, the engine ECU proceeds to Step S304, turns on the current supply to the solenoid, and pushes out the pinion. Further in Step S305, the engine ECU turns on the current supply to the motor, and starts the torque transmission through both the pinion and the belt.

Then, in Step S306, the engine ECU turns off the current supply to the motor when the number of engine revolutions Ne becomes more than the number of revolutions Nf, which is the starting condition, and the engine starting is completed.

Further, for this configuration, a certain speed reduction ratio is provided in accordance with a size of the ring gear, namely, a distance between the crankshaft and a motor generator shaft. However, when a speed increase is provided in the pinion gear-side speed reduction part 8 on a design stage, an optimal speed reduction ratio can easily be set regardless of the arrangement.

Necessity of installation of a starter dedicated to the driving at a low temperature is eliminated by starting the engine through this system. Therefore, a decrease in the weight and a decrease in the cost can be realized. Further, wasteful energy for rotating the two motors is not required unlike a case where the starter and the motor generator are caused to cooperate with each other to start the engine.

In this configuration, as timing at which the pinion gear 10 is pushed out toward the ring gear 100, the pinion gear 10 may be pushed out, and then the motor may be rotated. However, the meshing actually occurs after the pillion gear 10 and the ring gear 100 match each other in phase, and a collision thus occurs on the torque transmission surface sides.

On this occasion, the one-way clutch part 9 is attached to the pinion gear 10. Thus, a collision sound is decreased by rotating the ring gear 100 by the belt driving after the pinion gear 10 is pushed out, and carrying out the meshing while the one-way clutch is used for synchronization. Thus, the pinion gear 10 only needs to be pushed out for the meshing after the motor is rotated.

Moreover, when a helical spline is used for the coupling to transmit the torque to the output shaft of the pinion gear-side speed reduction part 8 in the one-way clutch part 9, the meshing is smoothly carried out when the pinion gear 10 is pushed out.

As described above, the first embodiment includes such a configuration that the one motor is used to realize the belt driving mechanism and the gear driving mechanism at the two different speed reduction ratios, and the gear driving mechanism has the one-way clutch function. As a result, as illustrated in the flowchart of FIG. 3, when the temperature T is equal to or less than the certain determination reference temperature Ts, the pinion gear is pushed out to mesh with the engine-side gear through the current supply control so that the engine starting can be carried out by the one motor through simultaneous use of the belt driving mechanism and the gear driving mechanism.

Further, the engine-side gear and the pinion-side gear can match each other in the phase by carrying out the current supply control after the engine is rotated through the belt, which is always connected, by rotating the motor generator. As a result, even when the engine or the motor is rotating, the meshing can smoothly be carried out.

Figure 4:
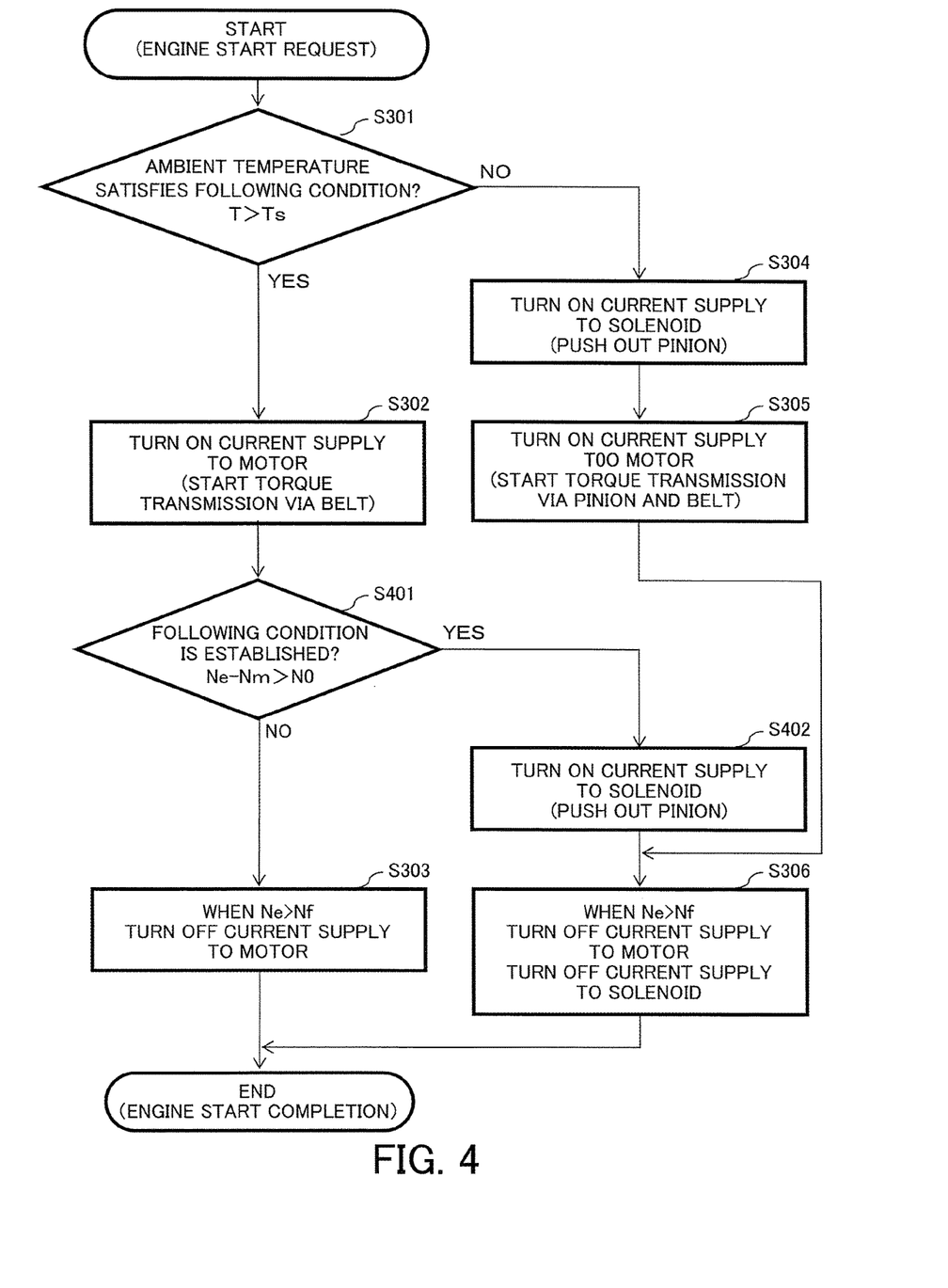
FIG. 4 is a control flowchart that can support a case in which a belt slips when the engine is started according to the first embodiment of the present invention.

FIG. 4 is a flowchart for illustrating a series of processing different from that of FIG. 3, which is carried out by the engine ECU in the engine starting device according to the first embodiment of the present invention. The flowchart of FIG. 4 is different from the flowchart of FIG. 3 in that Step S401 and Step S402 are further added. In the following, a description is thus given mainly of Step S401 and Step S402, which are newly added.

When the engine starting request is made, and the ambient temperature T is more than the determination reference temperature Ts, the current supply to the motor is turned on, and the torque transmission is started through the belt (Step S301 and Step S302).

Next, in Step S401, the engine ECU determines whether or not a difference between the number of engine revolutions Ne and the number of motor revolutions Nm is more than an allowable revolution number difference N0 set in advance. Then, when the difference is determined to be more than the allowable revolution number difference N0 in Step S401, the engine ECU can determine that the belt is slipping.

Thus, in this case, the engine ECU proceeds to Step S402, turns on the current supply to the solenoid, and pushes out the pinion so that the pinion gear 10 and the ring gear 100 mesh with each other. The engine ECU starts the engine in this way.

Then, the engine ECU proceeds to Step S306, and only needs to turn off the current supply to the motor, thereby turning off the current supply to the solenoid when the number of engine revolutions Ne becomes more than the number of revolutions Nf, which is the starting condition. As a result of this processing, the engine starting is completed.

On the other hand, as in the case of FIG. 3, when the ambient temperature T is determined to be a low temperature that is equal to or less than the determination reference temperature Ts in Step S301, and the state is in the region where the belt starting is impossible, the engine may be started by turning on the current supply to the solenoid, thereby pushing out the pinion, turning on the current supply to the motor, and starting the torque transmission by the pinion and the belt (Step S304 and Step S305).

As described above, the flowchart of FIG. 4 further includes Step S401 and Step S402. When the number of revolutions Nm of the pinion reduced due to the motor rotation is more than the number of engine revolutions Ne by a certain amount, the meshing degrades. Thus, in Step S401, whether or not the current is to be supplied to the solenoid coil is determined by determining whether or not the value of Ne−Nm is more than N0. Moreover, an appropriate magnitude of the speed reduction ratio only needs to be determined so as to allow a margin for this determination processing.

Thus, even when the starting is carried out by the belt driving, after the belt is determined to be slipping, the current supply to the solenoid coil is turned on under a predetermined condition, thereby pushing out the pinion so that the engine can be started. As a result, while the determination reference temperature Ts for the low temperature of the related art needs to be set with a certain margin, the determination reference temperature Ts according to the present invention can be set to be lower. As a result, the engine starting method according to the present invention including the processing of FIG. 4 enables the starting by the belt transmission at a lower temperature.

Thus, a region of the belt starting can be increased not only in the case of the normal starting but also in the case of the restarting the engine from the stop for the idle stop. Hitherto, the starting by the meshing between the pinion and the ring gear, which generates great noise, has not been able to be carried out in the idle stop due to a sense of discomfort. However, as the chance of the belt starting increases, the number of times of the idle stop itself can be increased, which can also contribute to a decrease in the fuel consumption.

In other words, with the configuration of the first embodiment, a connection that automatically provides a high torque at a low rotation can be realized, starting by appropriate motor energy can be enabled, and the engine starting can consequently be carried out quickly. Thus, when the engine is started only by the energy of the motor generator always connected via the belt, as compared to the related-art case where the two engine starting devices, which are the starter and the motor generator, are used for the starting, a compact size, a light weight, a low cost, and quick starting can be realized.

Further, not only the simple starting at a low temperature can be carried out without the related-art two motors, which are the starter and the motor generator, but also the engine can be started by the pinion gear even in case of emergency where the belt is determined not to be able to transmit the torque, because the two outputs are provided.

Figure 5:
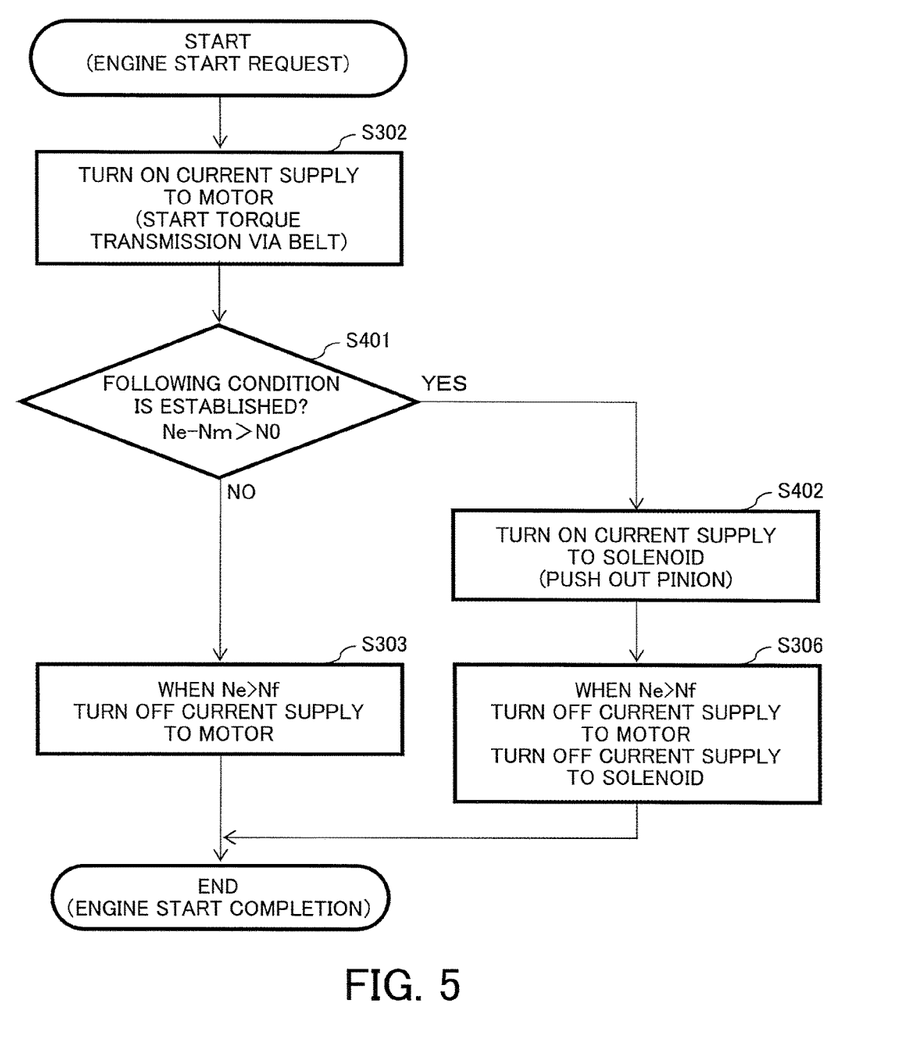
FIG. 5 is a control flowchart that does not use determination of a temperature for the slip when the engine is started according to the first embodiment of the present invention.

Further, the engine starting method according to the first embodiment is not limited to the flowcharts of FIG. 3 and FIG. 4. FIG. 5 is a flowchart for illustrating a series of processing different from those of FIG. 3 and FIG. 4, which is carried out by the engine ECU in the engine starting device according to the first embodiment of the present invention.

The flowchart of FIG. 5 is different from the flowchart of FIG. 4 in that the processing in Step S301, Step S304, and Step S305 is removed. In the processing illustrated in FIG. 6, when the engine starting request is made, in Step S302, the engine ECU directly turns on the current supply to the motor, thereby starting the torque transmission via the belt.

Then, in Step S401, the engine ECU determines the slip from the number of revolutions Ne of the engine and the number of revolutions Nm of the motor, proceeds to Step S402 under the condition under which the slip occurs, and turns on the current supply to the solenoid, thereby starting the engine.

In this way, the engine starting processing can be carried out by eliminating the processing in Step S301, Step S304, and Step S305, thereby detecting only the rotation of the engine and the rotation of the motor without detecting the temperature. As a result, a temperature sensor or a sensor for detecting the slip is eliminated, resulting in suppression of an increase in a manufacturing cost.

Second Embodiment

In the first embodiment, a description is given of a case where the engine is started by meshing the pinion gear 10, which is always rotated by the motor rotation, with the ring gear 100 on the engine side, thereby rotating the ring gear 100 on the engine side. In contrast, in a second embodiment of the present invention, a description is given of a case where such a structure that the ring gear 100 on the engine side and the pinion gear 10 can be independent of the rotation of the motor is employed, thereby realizing a configuration silent and excellent in durability.

Figure 6:
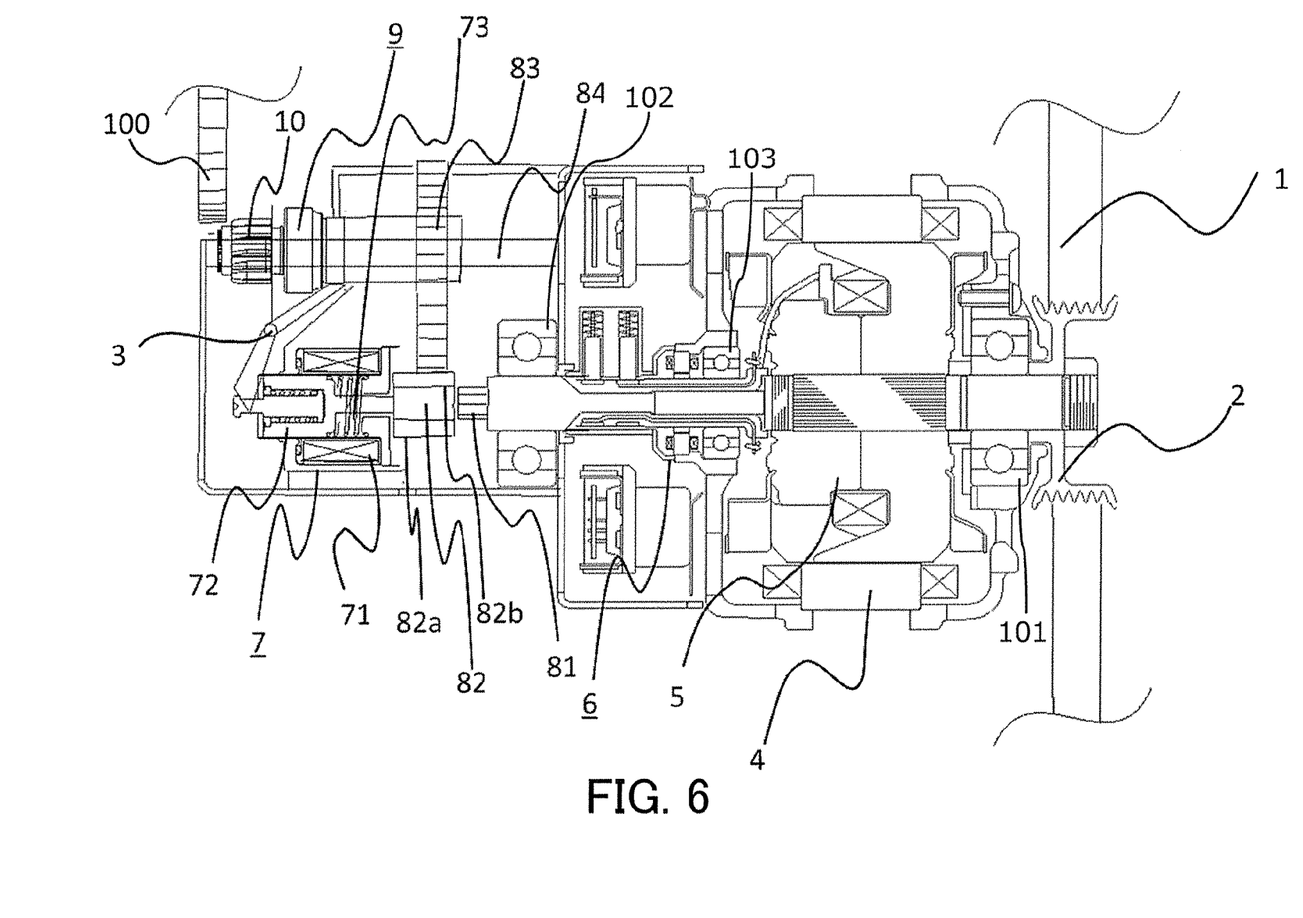
FIG. 6 is a cross sectional view for illustrating a motor generator part on which an engine starting device according to a second embodiment of the present invention is installed.

FIG. 6 is a cross sectional view for illustrating a motor generator part on which an engine starting device according to the second embodiment of the present invention is installed. In FIG. 6, the engine ECU is configured to carry out the control including the function of determining the engine starting through the key starting, the engine stopping in the idle stop, and the engine restarting, thereby carrying out the driving control of starting the engine as in the case of FIG. 1 according to the first embodiment.

The crankshaft of the engine is always connected to the motor generator through the pulley 2 via the belt 1. The rotor part 4, the stator part 5, and the inverter part 6 inside the motor generator are the same as those of the first embodiment.

In FIG. 6, a pinion gear 81, a coaxial moving gear 82, a gear 83, and an intermediate gear shaft 84 are added as new components, and a description is now given mainly of those added components.

The pinion gear 81 is directly coupled to the rotation shaft of the inverter part 6. Moreover, the coaxial moving gear 82 includes outer teeth 82a and inner teeth 82b, and is configured to move toward the motor side when the current is supplied to the solenoid coil 71 so that the inner teeth 82b mesh with the pinion gear 81. Moreover, the outer teeth 82a formed on an outer periphery of the coaxial moving gear 82 are always meshing with the gear 83.

The gear 83 is configured to move together with the one-way clutch part 9 and the pinion gear 10 in the axial direction with respect to the intermediate gear shaft 84.

In a motor generator mechanism according to the second embodiment configured in this way, for starting under a predetermined condition such as a low temperature, the engine ECU rotates the motor so as to rotate the pulley 2, thereby rotating the engine through the belt 1. Further, the engine ECU supplies the current to the solenoid coil 71 after a delay since the belt driving, thereby pulling in the plunger 72 toward the motor side.

The plunger 72 is pulled in toward the motor side, and consequently, the pinion gear 10 and the one-way clutch part 9 are pushed toward the direction of the ring gear 100 via the lever 3. Further, the plunger 72 is coupled to the coaxial moving gear 82 capable of moving in the axial direction. Thus, when the plunger 72 is pulled in toward the motor side, the coaxial moving gear 82 is moved toward the motor side, and consequently the coaxial pinion gear 81 output from the motor side and the inner teeth 82b of the coaxial moving gear 82 mesh with each other.

As a result, the rotation of the motor rotates the gear 82 via the pinion gear 81, rotates the gear 83 meshing with the outer teeth 82a of the gear 82, and rotates the intermediate gear shaft 84, thereby enabling rotation of the pinion gear 10. The pinion gear 10 is rotated by the current supply to the solenoid coil 71 in this way, and the torque of the motor can be transmitted to the ring gear 100.

As in the first embodiment, the belt driving part connected always has a region where the slip occurs at a low temperature, and the engine can thus not be started. In contrast, the engine can easily be started even at a low temperature by transmitting a rotation force caused by the meshing between the pinion gear 10 and the ring gear 100 to the engine side.

Further, according to the second embodiment, the size can be decreased, and a wasteful increase in the inertia can be suppressed by limiting the rotating parts to the pinion gear 81 also during the power generation by the motor generator. Further, the noise can be decreased by causing the pinion gear 81 and the inner teeth 82b mesh with each other after the pinion gear 10 and the ring gear 100 mesh with each other.

Moreover, due to the existence of the intermediate gear shaft 84 independent of the motor rotation, the engine rotation by the belt rotation and the rotation direction by the ring gear 100 can match each other.

Moreover, there may be a case in which alignment needs to be simultaneously carried out for the two shafts, which are the belt shaft and the pinion shaft, because a tension of the belt is not independently adjusted by a belt tensioner, for example. This case may be handled by, as in the second embodiment, employing the configuration including the intermediate gear shaft 84 as a second shaft independent of the motor rotation shaft so that this second shaft is finely correctable in a movable manner. Specifically, this case may be handled by fine correction within a meshing range between the coaxial moving gear 82 and the gear 83.

As described above, the second embodiment includes such a configuration that the one motor is used to realize the belt driving mechanism and the gear driving mechanism at the two different speed reduction ratios, and the gear driving mechanism has the one-way clutch function. As a result, the same effect as that of the first embodiment can be provided.

Further, according to the second embodiment, the gear driving mechanism is constructed so as to include the output shaft independent of the motor rotation shaft, and this output shaft of the gear driving mechanism is constructed as the shaft capable of disconnecting the torque transmission from the rotation shaft of the motor generator. As a result, the respective engine rotation directions of the belt mechanism and the gear mechanism can easily match each other without inverting the rotation direction in the speed reduction mechanism of the pinion gear-side speed reduction part. Moreover, a wasteful increase in the inertia can be suppressed, and the tension adjustment of the belt can easily be carried out. Further, the noise can be decreased by controlling the intermediate gear shaft to rotate after the pinion gear and the ring gear mesh with each other.

The invention claimed is:

1. A motor generator, which is always connected to an engine via a belt, and is configured to carry out start control of the engine and power generation control,
the motor generator having a two-output power transmission mechanism comprising:
a belt driving mechanism, which is configured to drive the engine through the belt and a pulley, such that the motor generator is always connected to an engine via the belt; and
a gear driving mechanism, which comprises a pinion gear to be coupled to a ring gear on the engine side in accordance with an external instruction, and is configured to drive the engine by the pinion gear being coupled to the ring gear,
wherein the pulley and the pinion gear rotate based on a rotation of a rotation shaft of the motor generator by a rotation of a rotor of the motor generator.

2. A motor generator according to claim 1, wherein the gear driving mechanism is configured to drive the engine at a speed reduction ratio that is equal to or more than a speed reduction ratio at which the belt driving mechanism drives the engine.

3. A motor generator according to claim 2, wherein the speed reduction ratio is set to a required revolution number for engine start.

4. A motor generator according to claim 1, wherein an output shaft of the gear driving mechanism is configured as a shaft capable of disconnecting torque transmission from a rotation shaft of the motor generator.

5. A motor generator according to claim 1, wherein, when a current is supplied to an electromagnetic switch, the pinion gear is configured to be coupled to a rotation shaft of the motor generator through a helical spline so as to be pushed out.

6. An engine starting device, comprising:
the motor generator of claim 1; and
a control circuit configured to control the motor generator, the control circuit being configured to:
carry out the start control of the engine by rotating the motor generator, thereby driving the engine by the belt driving mechanism; and
carry out the start control of the engine through simultaneous use of the belt driving mechanism and the gear driving mechanism by outputting the external instruction, thereby driving the engine by the gear driving mechanism, when a condition under which slip occurs to the belt is established.

7. An engine starting device according to claim 6, wherein the control circuit is configured to determine whether or not the condition under which the slip occurs to the belt is established based on a measurement result of an engine temperature or an engine ambient temperature.

8. An engine starting device according to claim 7, wherein:
the gear driving mechanism further comprises an electromagnetic switch for pushing out the pinion gear through a current supply so as to couple the pinion gear to the ring gear; and
the control circuit is configured to output the external instruction, thereby supplying a current to the electromagnetic switch when the control circuit determines, from the measurement result of the engine temperature or the engine ambient temperature, that the condition under which the slip occurs to the belt is established.

9. An engine starting device according to claim 8, wherein, when the current is supplied to the electromagnetic switch, the pinion gear is configured to be coupled to a rotation shaft of the motor generator through a helical spline so as to be pushed out.

10. An engine start control method, which is carried out by the control circuit in the engine starting device of claim 8, the engine start control method comprising, when the start control of the engine is carried out:
a first step of rotating the motor generator, thereby driving the engine by the belt driving mechanism; and
a second step of outputting the external instruction of supplying the current to the electromagnetic switch, and driving the engine by the gear driving mechanism, thereby carrying out engine start control through simultaneous use of the belt driving mechanism and the gear driving mechanism, when the condition under which the slip occurs to the belt is determined to be established from the measurement result of the engine temperature or the engine ambient temperature after the first step.

11. An engine start control method of controlling the motor generator of claim 5, comprising, when the start control of the engine is carried out:
a first step of rotating the motor generator, thereby driving the engine by the belt driving mechanism; and
a second step of outputting the external instruction of supplying the current to the electromagnetic switch, and driving the engine by the gear driving mechanism, thereby carrying out engine start control through simultaneous use of the belt driving mechanism and the gear driving mechanism, when the condition under which the slip occurs to the belt is determined to be established from a measurement result of an engine temperature or an engine ambient temperature after the first step.

12. A motor generator according to claim 1, wherein said pinion gear is coupled with a one-way clutch, and the pinion gear idles when the number of revolutions of the ring gear becomes higher than the number of revolutions of the pinion gear.

13. A motor generator, which is always connected to an engine via a belt, and is configured to carry out start control of the engine and power generation control,
the motor generator having a two-output power transmission mechanism comprising:
a belt driving mechanism, which is configured to drive the engine through the belt and a pulley, such that the motor generator is always connected to an engine via the belt;
a gear driving mechanism, which comprises a pinion gear to be coupled to a ring gear on the engine side in accordance with an external instruction, and is configured to drive the engine by the pinion gear being coupled to the ring gear, and
an inverter arranged between a rotor and the pinion gear in an axial direction of a rotation shaft of the motor generator, and converting AC power generated by rotating the rotor into DC power by a rectifier, wherein the pulley and the pinion gear rotate based on a rotation of a rotation shaft of the motor generator by a rotation of the rotor of the motor generator, an output of the belt driving mechanism and an output of the gear driving mechanism are arranged at positions opposing each other in the axial direction of the rotation shaft of the motor generator; and the motor generator comprises three bearings provided at the rotation shaft, a first bearing provided between the rotor and the inverter, a second bearing provided at the pinion side as against the inverter, and a third bearing provided at the pulley side as against the rotor.

14. A motor generator according to claim 13, wherein the gear driving mechanism is configured to drive the engine at a speed reduction ratio that is equal to or more than a speed reduction ratio at which the belt driving mechanism drives the engine.

15. A motor generator according to claim 13, wherein an output shaft of the gear driving mechanism is configured as a shaft capable of disconnecting torque transmission from a rotation shaft of the motor generator.

16. A motor generator according to claim 13, wherein, when a current is supplied to an electromagnetic switch, the pinion gear is configured to be coupled to a rotation shaft of the motor generator through a helical spline so as to be pushed out.

17. An engine starting device, comprising:
the motor generator of claim 13; and
a control circuit configured to control the motor generator, the control circuit being configured to:
    carry out the start control of the engine by rotating the motor generator, thereby driving the engine by the belt driving mechanism; and
    carry out the start control of the engine through simultaneous use of the belt driving mechanism and the gear driving mechanism by outputting the external instruction, thereby driving the engine by the gear driving mechanism, when a condition under which slip occurs to the belt is established.

18. An engine starting device according to claim 17, wherein the control circuit is configured to determine whether or not the condition under which the slip occurs to the belt is established based on a measurement result of an engine temperature or an engine ambient temperature.

19. An engine starting device according to claim 18, wherein:
    the gear driving mechanism further comprises an electromagnetic switch for pushing out the pinion gear through a current supply so as to couple the pinion gear to the ring gear; and
    the control circuit is configured to output the external instruction, thereby supplying a current to the electromagnetic switch when the control circuit determines, from the measurement result of the engine temperature or the engine ambient temperature, that the condition under which the slip occurs to the belt is established.

20. An engine start control method of controlling the motor generator of claim 16, comprising, when the start control of the engine is carried out:
    a first step of rotating the motor generator, thereby driving the engine by the belt driving mechanism; and
    a second step of outputting the external instruction of supplying the current to the electromagnetic switch, and driving the engine by the gear driving mechanism, thereby carrying out engine start control through simultaneous use of the belt driving mechanism and the gear driving mechanism, when the condition under which the slip occurs to the belt is determined to be established from a measurement result of an engine temperature or an engine ambient temperature after the first step.

* * * * *